United States Patent
Li (10) Patent No.: US 11,074,445 B2
(45) Date of Patent: Jul. 27, 2021

(54) REMOTE SENSING IMAGE RECOGNITION METHOD AND APPARATUS, STORAGE MEDIUM AND ELECTRONIC DEVICE

(71) Applicant: BEIJING SENSETIME TECHNOLOGY DEVELOPMENT CO., LTD., Beijing (CN)

(72) Inventor: Cong Li, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/909,291

(22) Filed: Jun. 23, 2020

(65) Prior Publication Data

US 2020/0320273 A1    Oct. 8, 2020

Related U.S. Application Data

(63) Continuation of application No. PCT/CN2018/123807, filed on Dec. 26, 2018.

(30) Foreign Application Priority Data

Dec. 26, 2017 (CN) .......................... 201711436470.2

(51) Int. Cl.
G06K 9/00 (2006.01)
G06N 3/08 (2006.01)

(52) U.S. Cl.
CPC ............. G06K 9/0063 (2013.01); G06N 3/08 (2013.01)

(58) Field of Classification Search
CPC ................................ G06K 9/0063; G06N 3/08
See application file for complete search history.

(56) References Cited

U.S. PATENT DOCUMENTS

2013/0070057 A1* 3/2013 Narayanan ............ H04N 5/345
348/46
2014/0334736 A1* 11/2014 Niu .................... G06K 9/00295
382/195

FOREIGN PATENT DOCUMENTS

CN    101826157 A    9/2010
CN    102186069 A    9/2011
(Continued)

OTHER PUBLICATIONS

First Office Action of the Chinese application No. 201711436470.2, dated Dec. 13, 2019, 21 pgs.
(Continued)

*Primary Examiner* — Zhihan Zhou
(74) *Attorney, Agent, or Firm* — Cooper Legal Group, LLC (57) ABSTRACT

A remote sensing image recognition method, apparatus and device, a storage medium and a computer program. The remote sensing image recognition method comprises: performing resolution reduction processing on a remote sensing image to be recognized to obtain a resolution reduction processed remote sensing image (S100); segmenting at least one remote sensing image block from the resolution reduction processed remote sensing image (S110); determining, from the at least one remote sensing image block, a remote sensing image block to be processed (S120); inputting, into a neural network, the remote sensing image block to be processed, and obtaining, through the neural network, classification probability information of pixels in the input remote sensing image block to be processed (S130); and determining a recognition result of the remote sensing image to be recognized, according to the classification probability information of the pixels in the remote sensing image block to be processed (S140).

13 Claims, 4 Drawing Sheets

(56) References Cited

FOREIGN PATENT DOCUMENTS

| CN | 103093182 A | 5/2013 |
|---|---|---|
| CN | 103150561 A | 6/2013 |
| CN | 103310195 A | 9/2013 |
| CN | 104463873 A | 3/2015 |
| CN | 105046231 A | 11/2015 |
| CN | 106548192 A | 3/2017 |
| CN | 106778821 A | 5/2017 |
| CN | 108304775 A | 7/2018 |

OTHER PUBLICATIONS

International Search Report in the international application No. PCT/CN2018/123807, dated Mar. 28, 2019, 2 pgs.
English translation of the Written Opinion of the International Search Authority in the international application No. PCT/CN2018/123807, dated Mar. 28, 2019, 6 pgs.
Second Office Action of the Chinese application No. 201711436470.2, dated Nov. 2, 2020, 17 pgs.

\* cited by examiner

REMOTE SENSING IMAGE RECOGNITION METHOD AND APPARATUS, STORAGE MEDIUM AND ELECTRONIC DEVICE

CROSS-REFERENCE TO RELATED APPLICATION

This application is a continuation application of International Patent Application No. PCT/CN2018/123807, filed on Dec. 26, 2018, which claims priority to Chinese patent application No. CN201711436470.2, filed to the Patent Office of the People's Republic of China on Dec. 26, 2017 and entitled "Remote Sensing Image Recognition Method and Apparatus, Storage Medium and Electronic Device". The disclosures of International Patent Application No. PCT/CN2018/123807 and Chinese patent application No. CN201711436470.2 are hereby incorporated by reference in their entireties.

BACKGROUND

With the continuous breakthrough of deep learning technologies in image recognition, target detection, image segmentation and other aspects, convolutional neural networks have been applied to the field of remote sensing image recognition.

In a process of remote sensing image recognition, a prediction result of a pixel is usually determined by other pixels within a certain region around the pixel, and the region may be called a receptive field of a neuron of a convolutional neural network.

A receptive field of a neuron of a convolutional neural network is usually limited (for example, there are hundreds of pixels), while a size of a remote sensing image is usually relatively large (for example, a length and width of the remote sensing image may reach thousands or even ten thousands of pixels), so that enough environmental information may not be obtained from the limited receptive field of the neuron, which may usually result in misrecognition of the pixels in the remote sensing image by the convolutional neural network.

How to improve the recognition accuracy of a remote sensing image at the same time of avoiding the calculation amount of a neural network being greatly increased as much as possible is a technical problem of concern.

SUMMARY

The present disclosure relates to computer vision technologies, and particularly, to a remote sensing image recognition method, remote sensing image recognition apparatus, computer-readable storage medium and electronic device.

According to one aspect of the implementations of the present disclosure, a method for recognizing a remote sensing image is provided, which may mainly include that: present resolution reduction processing is performed on a remote sensing image to be recognized to obtain a remote sensing image with reduced resolution; the remote sensing image with reduced resolution is segmented to obtain at least one remote sensing image block; a remote sensing image block to be processed from the at least one remote sensing image block is determined; category probability information of pixels in the remote sensing image block to be processed is obtained through a neural network; and a recognition result of the remote sensing image to be recognized is determined according to the category probability information of the pixels in the remote sensing image block to be processed.

According to another aspect of the implementations of the present disclosure, an apparatus for recognizing a remote sensing image is provided, which may mainly include: a resolution reduction module, configured to perform present resolution reduction processing on a remote sensing image to be recognized to obtain a remote sensing image with reduced resolution; a remote sensing image segmentation module, configured to segment the remote sensing image with reduced resolution to obtain at least one remote sensing image block; an image block selection module, configured to determine a remote sensing image block to be processed from the at least one remote sensing image block; a category processing module, configured to obtain category probability information of pixels in the remote sensing image block to be processed through a neural network; and a recognition result determination module, configured to determine a recognition result of the remote sensing image to be recognized according to the category probability information of the pixels in the remote sensing image block to be processed.

According to another aspect of the implementations of the present disclosure, an electronic device is provided, which may include: a memory, configured to store a computer program; and a processor, configured to execute the computer program stored in the memory, the computer program being executed to implement the method of any implementation of the present disclosure.

According to another aspect of the implementations of the present disclosure, a computer-readable storage medium is provided, in which a computer program may be stored, the computer program being executed by a processor to implement the method of any implementation of the present disclosure.

According to another aspect of the implementations of the present disclosure, a computer program is provided, which may be executed by a processor in a device to implement the method of any implementation of the present disclosure.

The technical solutions of the present disclosure will further be described below through the drawings and the implementations in detail.

BRIEF DESCRIPTION OF THE DRAWINGS

The drawings, which constitute a part of the specification, depict the implementations of the present disclosure and, along with the detailed descriptions, are adopted to explain the principle of the present disclosure.

The present disclosure can be more clearly understood from the detailed description below with reference to the drawings, in which.

DETAILED DESCRIPTION

Each exemplary implementation of the present disclosure will now be described with reference to the drawings in detail. It is to be noted that relative arrangement of components and steps, numeric expressions and numeric values elaborated in these implementations do not limit the scope of the present disclosure, unless otherwise specifically described.

In addition, it is to be understood that, for convenient description, the size of various parts illustrated in the drawings is not drawn according to a practical proportional relationship.

The following descriptions of at least one exemplary implementation are only illustrative in fact and not intended to form any limit to the present disclosure and application or use thereof.

Technologies, methods and devices known to those of ordinary skill in the art may not be discussed in detail, but the technologies, the methods and the devices should be considered as a part of the specification as appropriate.

It is to be noted that similar reference signs and letters represent similar terms in the following drawings and thus a certain term, once being defined in a drawing, is not required to be further discussed in subsequent drawings.

The implementations of the present disclosure may be applied to an electronic device such as a terminal device, a computer system and a server, which may be operated together with numerous other universal or dedicated computing system environments or configurations. Examples of well-known computing systems, environments and/or configurations suitable for use together with the electronic device such as the terminal device, the computer system and the server include, but not limited to, a Personal Computer (PC) system, a server computer system, a thin client, a thick client, a handheld or laptop device, a microprocessor-based system, a set-top box, a programmable consumer electronic product, a network PC, a microcomputer system, a large computer system, a distributed cloud computing technical environment including any abovementioned system, and the like.

The electronic device such as the terminal device, the computer system and the server may be described in a general context of a computer system executable instruction (for example, a program module) executed by the computer system. Under a normal condition, the program module may include a routine, a program, a target program, a component, a logic, a data structure and the like, and they execute specific tasks or implement specific abstract data types. The computer system/server may be implemented in a distributed cloud computing environment, and in the distributed cloud computing environment, tasks are executed by a remote processing device connected through a communication network. In the distributed cloud computing environment, the program module may be in a storage medium of a local or remote computer system including a storage device.

Exemplary Embodiment

The technical solutions for remote sensing image recognition provided in the present disclosure may be implemented by an electronic device capable of running a computer program (which may also be referred to as program codes) such as a single-chip microcomputer, a Field Programmable Gate Array (FPGA), a microprocessor, a smart mobile phone, a notebook computer, a tablet computer, a desktop computer or a server, and the computer program may be stored in a computer-readable storage medium such as a flash memory, a cache, a hard disk or an optical disk.

The technical solutions for remote sensing image recognition provided in the present disclosure will be described below with reference to FIG. 1 to FIG. 7.

Figure 1:
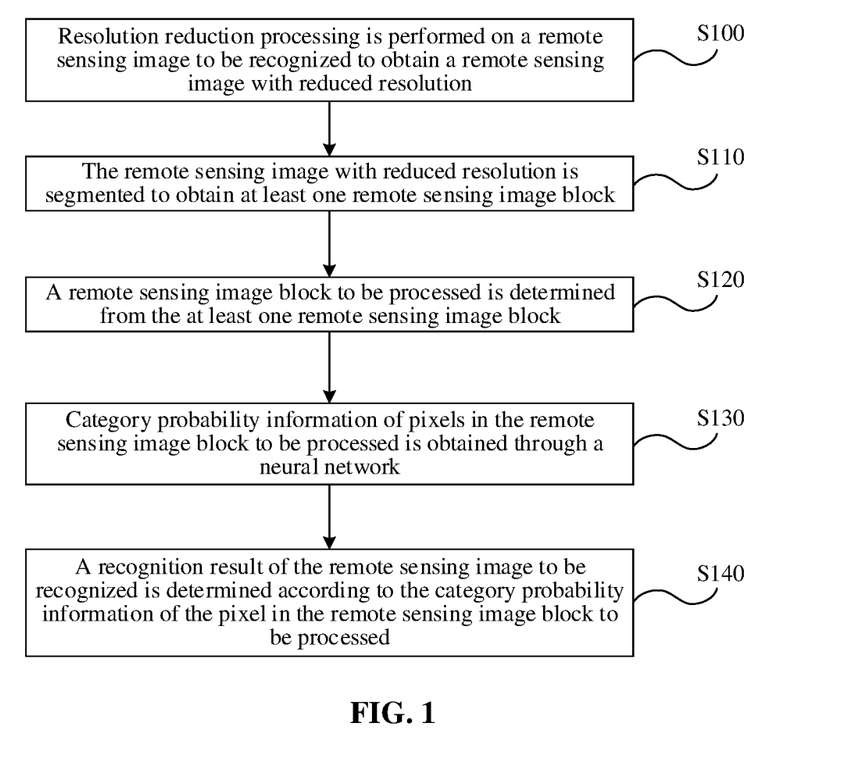
FIG. 1 is a flowchart of an implementation of a remote sensing image recognition method according to the present disclosure.

FIG. 1 is a flowchart of an implementation of a remote sensing image recognition method according to the present disclosure. As illustrated in FIG. 1, the remote sensing image recognition method of the implementation mainly includes S100, S110, S120, S130 and S140. Various operations in the present disclosure will be described below in detail.

In S100, present resolution reduction processing is performed on a remote sensing image to be recognized to obtain a remote sensing image with reduced resolution.

In at least some embodiments, there may be one or more resolution reduction processings. If there are a plurality of resolution reduction processings, the present resolution reduction processing is one of the plurality of resolution reduction processings.

In an optional example, resolution reduction processing may be performed on the remote sensing image to be recognized in multiple manners in the present disclosure. For example, in the present disclosure, a reduction scale set is preset, the reduction scale set including at least two different reduction values. In the present disclosure, an unused reduction value may be selected from the reduction scale set, and resolution reduction processing is performed on the remote sensing image to be recognized according to the selected reduction value. In addition, in the present disclosure, when the unused reduction value is selected, an unused minimum reduction value may usually be preferred. Moreover, in the present disclosure, resolution reduction processing may also be performed on the remote sensing image to be recognized in a pooling processing or down-sampling processing manner, etc. An implementation of resolution reduction processing over the remote sensing image to be recognized is not limited in the present disclosure.

In an optional example, S100 may be executed by a processor by calling corresponding instructions stored in a memory, or may be executed by a resolution reduction module 500 operated by the processor.

In S110, the remote sensing image with reduced resolution is segmented to obtain at least one remote sensing image block.

In an optional example, in the present disclosure, the remote sensing image with reduced resolution processing is usually segmented into multiple remote sensing image blocks according to a requirement of a neural network on a size of the input image. All the remote sensing image blocks obtained by segmentation are usually completely the same in size. Each remote sensing image block obtained by segmentation corresponds to a region in the remote sensing image to be recognized, and different remote sensing image blocks correspond to different regions. A size of the region corresponding to the remote sensing image block is usually related to the reduction value and the requirement of the neural network on the size of the input image. In an example, under a condition that the requirement of the neural network on the size of the input image is 561×561 and resolution reduction processing is ½-based resolution reduction processing, the size of the region, corresponding to the remote sensing image block obtained by segmentation in the present disclosure, in the remote sensing image to be recognized is 1,122×1,122. For example, a first remote sensing image block obtained by segmentation corresponds to a 1,122×1,122 region in the left upper corner of the remote sensing image to be recognized, and a last remote sensing image block obtained by segmentation corresponds to a 1,122×1,122 region in the right lower corner of the remote sensing image to be recognized. The number of the remote sensing image blocks obtained by segmentation and the size of the remote sensing image block are not limited in the present disclosure.

In an optional example, S110 may be executed by the processor by calling corresponding instructionss stored in the memory, or may be executed by a remote sensing image segmentation module 510 operated by the processor.

In S120, a remote sensing image block to be processed is determined from the at least one remote sensing image block.

In an optional example, under a condition that the resolution reduction processing is performed for the first time, all the remote sensing image blocks may be determined as remote sensing image blocks to be processed in the present disclosure. Under a condition that the resolution reduction processing is performed not for the first time, the number of remote sensing image blocks to be processed determined in the present disclosure may usually be smaller than the number of all the remote sensing image blocks presently obtained by segmentation.

In an optional example, under a condition that the resolution reduction processing is performed not for the first time, in the present disclosure, the at least one remote sensing image block obtained by segmentation may be selected according to present confidences of the pixels of the remote sensing image to be recognized, and the selected remote sensing image block is the remote sensing image block to be processed. In an optional example, in the present disclosure, a present confidence of at least one pixel is determined at first according to present category probability information of the at least one pixel in the remote sensing image to be recognized. For example, for a pixel in the remote sensing image to be recognized, a ratio of a maximum category probability and second maximum category probability of the pixel is calculated, and the calculated ratio is determined as a present confidence of the pixel. According to such processing, present confidences of all pixels in the remote sensing image to be recognized may be obtained. Then, the numbers of the pixels of which the present confidences reach a predetermined confidence in the pixels in the regions of the remote sensing image to be recognized that correspond to the remote sensing image blocks are statistically obtained, and the remote sensing image block of which the number of the pixels reaching the predetermined confidence does not meet a predetermined requirement is determined as a remote sensing image block to be processed. For example, for a remote sensing image block, under a condition that a ratio of the number of the pixels reaching the predetermined confidence to the number of all the pixels in the region of the remote sensing image to be recognized that corresponds to the remote sensing image block is lower than a predetermined ratio, the remote sensing image block may be determined as a remote sensing image block to be processed.

In an optional example, the present category probability information of the at least one pixel of the remote sensing image to be recognized may be obtained in the following two manners in the present disclosure.

In a first manner, under a condition that the resolution reduction processing is performed for the first time, category probability information of at least one pixel in each remote sensing image block to be processed, that is output by the neural network, is mapped to the remote sensing image to be recognized to obtain the category probability information of the at least one pixel of the remote sensing image to be recognized. In the present disclosure, the presently obtained category probability information of the at least one pixel of the remote sensing image to be recognized may be determined as the present category probability information of the at least one pixel of the remote sensing image to be recognized.

In a second manner, under a condition that the resolution reduction processing is performed not for the first time, the category probability information of the at least one pixel in each remote sensing image block to be processed, that is output by the neural network, is mapped to the remote sensing image to be recognized to obtain the category probability information of the at least one pixel of the remote sensing image to be recognized, and the present category probability information of the corresponding pixel of the remote sensing image is updated according to the presently obtained category probability information of the at least one pixel of the remote sensing image to be recognized. For example, an average value of the presently obtained category probability information of the at least one pixel of the remote sensing image to be recognized and the present category probability information of the corresponding pixel in the remote sensing image to be recognized is calculated, and the present category probability information of the corresponding pixel in the remote sensing image to be recognized is updated with the calculated average value. After updating processing, the present category probability information of the at least one pixel of the remote sensing image to be recognized is obtained in the present disclosure.

In an optional example, S120 may be executed by the processor by calling corresponding instructions stored in the memory, or may be executed by an image block selection module 520 operated by the processor.

In S130, category probability information of pixels in the remote sensing image block to be processed is obtained through a neural network.

In an optional example, the neural network in the present disclosure may be a convolutional neural network. A representation form of the neural network is not limited in the present disclosure. In the present disclosure, resolution reduction processing is performed on the remote sensing image to be recognized, and the image block to be processed in the remote sensing image with reduced resolution is input into the neural network, so that enlargement of a receptive field of a neuron in the neural network is facilitated, and furthermore, misrecognition of the pixels in the remote sensing image by the neural network is favorably avoided.

In an optional example, the neural network in the present disclosure is obtained by training with remote sensing image samples with various resolutions. For example, the respective resolutions of all the remote sensing image samples are resolutions corresponding to the reduction values in the reduction scale set respectively. As an example, the reduction scale set includes a first reduction value, a second reduction value and a third reduction value, the first reduction value corresponds to a first resolution, the second reduction value corresponds to a second resolution, and the third reduction value corresponds to a third resolution. In such case, in the present disclosure, a neural network to be trained may be trained by use of a remote sensing image sample with the first resolution, a remote sensing image sample with the second resolution and a remote sensing image sample with the third resolution, and the successfully trained neural network may be configured for remote sensing image recognition of the present disclosure.

In an optional example, S130 may be executed by the processor by calling corresponding instructions stored in the memory, or may be executed by a category processing module 530 operated by the processor.

In S140, a recognition result of the remote sensing image to be recognized is determined according to the category probability information of the pixels in the remote sensing image block to be processed.

In an optional example, in the present disclosure, responsive to that the reduction scale set does not include any unused reduction value or the remote sensing image block to be processed in the at least one remote sensing image block may not be determined, the operation of determining the recognition result of the remote sensing image to be recognized according to the category probability information of the pixels in the remote sensing image block to be processed may be executed. For example, for a pixel in the remote sensing image to be recognized, a maximum probability of probabilities of the pixel belonging to the categories in the present category probability information of the pixel is determined, and the maximum probability and the category corresponding to the maximum probability are determined as a recognition result of the pixel.

In an optional example, S140 may be executed by the processor by calling corresponding instructions stored in the memory, or may be executed by a recognition result determination module 540 operated by the processor.

Based on the remote sensing image recognition method, remote sensing image recognition apparatus, electronic device, computer program and computer-readable storage medium provided in the present disclosure, in the present disclosure, the remote sensing image block is selected from the remote sensing image with reduced resolution and input into the neural network, so that the phenomenon of relatively large calculation amount of the neural network due to the fact that all remote sensing image blocks obtained by segmentation are input into the neural network after resolution reduction processing is avoided.

Figure 2:
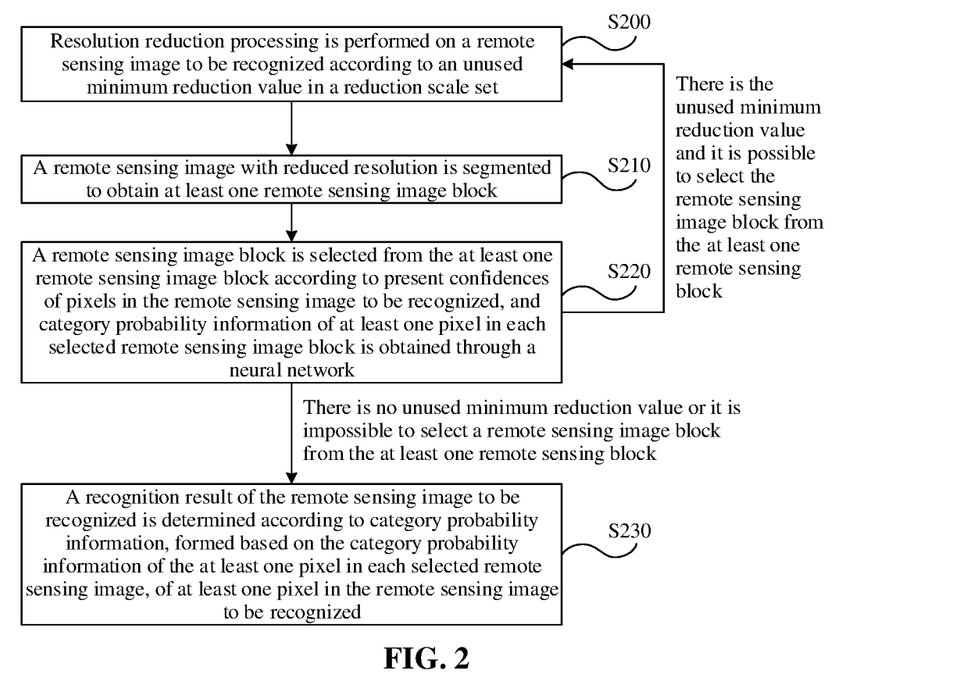
FIG. 2 is a flowchart of another implementation of a remote sensing image recognition method according to the present disclosure.

FIG. 2 is a flowchart of another implementation of a remote sensing image recognition method according to the present disclosure.

As illustrated in FIG. 2, the remote sensing image recognition method of the implementation mainly includes S200, S210, S220 and S230.

In S200, resolution reduction processing is performed on a remote sensing image to be recognized according to an unused minimum reduction value in a reduction scale set.

In an optional example, the reduction scale set is formed by multiple reduction values, and each reduction value is greater than 0 and not greater than 1. Under a normal condition, the reduction scale set includes at least two reduction values. In an optional example, Sr=[0.25, 0.5, 1.0], Sr represents the reduction scale set, 0.25, 0.5 and 1 therein are reduction values in the reduction scale set, 0.25 represents that a resolution of the remote sensing image to be recognized is reduced to be ¼ of the original resolution, 0.5 represents that the resolution of the remote sensing image to be recognized is reduced to be ½ of the original resolution, and 1 represents that the resolution of the remote sensing image to be recognized. In the embodiment, 1 is a special reduction value, and for example, may be considered to refer to a reduction value capable of maintaining the original resolution of the remote sensing image to be recognized. Magnitudes of the reduction values in the reduction scale set and the number of the reduction values that are included are not limited in the present disclosure.

In an optional example, in the present disclosure, a reduction value is selected from the reduction scale set according to an arrangement sequence from low to high reduction values every time, and resolution reduction processing is performed on the remote sensing image to be recognized according to the selected reduction value. The selected reduction value becomes a used reduction value.

In an optional example, S200 may be executed by a processor by calling corresponding instructions stored in a memory, or may be executed by a resolution reduction module 500 operated by the processor.

In S210, a remote sensing image with reduced resolution is segmented to obtain at least one remote sensing image block.

In an optional example, in the present disclosure, the remote sensing image obtained by resolution reduction processing is usually segmented into multiple remote sensing image blocks according to a requirement of a neural network on a size of the input image, and all the remote sensing image blocks obtained by segmentation are usually completely the same in size. Each remote sensing image block obtained by segmentation corresponds to a region in the remote sensing image to be recognized, and different remote sensing image blocks correspond to different regions. A size of the region corresponding to the remote sensing image block is usually related to the reduction value and the requirement of the neural network on the size of the input image. In an example, under a condition that the requirement of the neural network on the size of the input image is 561×561 and resolution reduction processing is ½-based resolution reduction processing, the size of the region of the remote sensing image to be recognized that corresponds to the remote sensing image block obtained by segmentation in the present disclosure is 1,122×1,122. For example, a first remote sensing image block obtained by segmentation corresponds to a 1,122×1,122 region in the left upper corner of the remote sensing image to be recognized, and a last remote sensing image block obtained by segmentation corresponds to a 1,122×1,122 region in the right lower corner of the remote sensing image to be recognized. The number of the remote sensing image blocks obtained by segmentation and the size of the remote sensing image block are not limited in the present disclosure.

In an optional example, S210 may be executed by the processor by calling corresponding instructions stored in the memory, or may be executed by a remote sensing image segmentation module 510 operated by the processor.

In S220, a remote sensing image block is selected from the at least one remote sensing image block according to present confidences of the pixels of the remote sensing image to be recognized, and category probability information of at least one pixel in each selected remote sensing image block is obtained through a neural network, the selected remote sensing image block being the abovementioned remote sensing image block to be processed.

In an optional example, under a condition that the resolution reduction processing is performed for the first time, all the remote sensing images obtained by segmentation may usually be determined as selected remote sensing image blocks. In the present disclosure, it may be considered that, under a condition that the resolution reduction processing is performed for the first time, the present confidence of the pixel of the remote sensing image to be recognized is initialized to be 0, so that all the remote sensing image blocks obtained by segmentation may be selected and input into the neural network respectively, and then category probability information of all pixels of all the remote sensing image blocks presently obtained by segmentation may be obtained through the neural network. The category probability information of all the pixels of all the presently obtained remote sensing image blocks may be configured to update the present confidence of the pixel of the remote sensing image to be recognized. In an optional example, it is set that category processing may be performed for C classes through the neural network in the present disclosure, and after each remote sensing image block passes through the neural network, category probability information of all the pixels in all the remote sensing image blocks for the C classes may be obtained in the present disclosure.

In an optional example, under a condition that the resolution reduction processing is performed not for the first time, the remote sensing image block may be selected from all the remote sensing image blocks presently obtained by segmentation according to the present confidence of the pixel of the remote sensing image to be recognized in the present disclosure. It is to be particularly noted that the presently selected remote sensing image block may be all the remote sensing image blocks presently obtained by segmentation or may be part of remote sensing image blocks in all the remote sensing image blocks presently obtained by segmentation. Of course, any remote sensing image block may not be selected from all the remote sensing image blocks presently obtained by segmentation.

In the present disclosure, resolution reduction processing is performed on the remote sensing image to be recognized, and the image block in the remote sensing image with reduced resolution is input into the neural network (for example, a convolutional neural network), so that enlargement of a receptive field of a neuron in the neural network (for example, the convolutional neural network) is facilitated, and furthermore, misrecognition of the pixels in the remote sensing image by the neural network is favorably avoided.

In an optional example, S220 may be executed by the processor by calling corresponding instructions stored in the memory, or may be executed by an image block selection module 520 and category processing module 530 operated by the processor.

Figure 3:
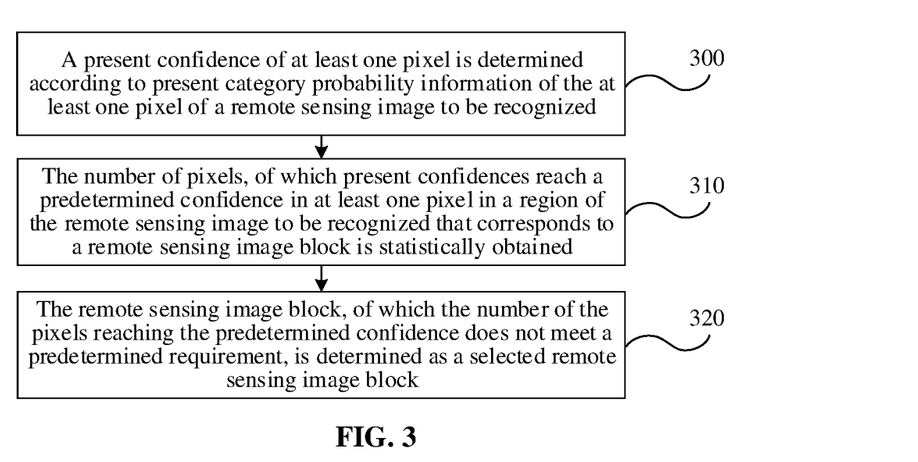
FIG. 3 is a flowchart of an implementation of selecting a remote sensing image block according to present confidences of the pixels of a remote sensing image to be recognized according to the present disclosure.

In the present disclosure, an optional example of selecting the remote sensing image block (i.e., the remote sensing image block to be processed) according to the present confidence of the pixel of the remote sensing image to be recognized is illustrated in FIG. 3.

In FIG. 3, in 300, a present confidence of at least one pixel is determined according to present category probability information of the at least one pixel of the remote sensing image to be recognized.

In an optional example, the present category probability information of the at least one pixel of the remote sensing image to be recognized in the present disclosure is formed based on category probability information, output by the neural network for at least one previously input remote sensing image block, of the at least one pixel in the remote sensing image block. In the present disclosure, the present category probability information of the at least one pixel of the remote sensing image to be recognized is required to be maintained (for example, the present category probability information of the at least one pixel of the remote sensing image to be recognized is updated) in each process of executing resolution reduction processing. In the present disclosure, a manner for maintaining the present category probability information of the at least one pixel of the remote sensing image to be recognized may refer to the following descriptions about FIG. 4.

In an optional example, for any pixel (i, j) in the remote sensing image to be recognized, a manner for determining a present confidence of the pixel (i, j) according to present category probability information of the pixel (i, j) of the remote sensing image to be recognized in the present disclosure may be as follows: it is set that C classes may be recognized from the remote sensing image through the neural network, the present category probability information of the pixel (i, j) may include C probabilities, a maximum probability and a second maximum probability (i.e., the second highest probability) may be selected from the C probabilities in the present disclosure, a ratio of the selected maximum category probability and second maximum category probability is calculated, and the ratio may be determined as the present confidence of the pixel (i, j) in the present disclosure. In the present disclosure, the present confidence of the at least one pixel of the remote sensing image to be recognized may also be determined in another manner according to the present category probability information of the at least one pixel of the remote sensing image to be recognized. The manner for determining the present confidence of the at least one pixel of the remote sensing image to be recognized is not limited in the present disclosure.

In an optional example, S300 may be executed by the processor by calling corresponding instructions stored in the memory, or may be executed by a first unit operated by the processor.

In 310, a number of pixels of which the present confidences reach a predetermined confidence in the at least one pixel in a region of the remote sensing image to be recognized that corresponds to the remote sensing image block is statistically obtained.

In an optional example, a magnitude of the predetermined confidence in the present disclosure may be set according to a practical requirement. For example, the predetermined confidence may be set to be 4. In the above example, under a condition that the size of the region of the remote sensing image to be recognized that corresponds to the remote sensing image block is 1,122×1,122, for a remote sensing image block, whether present confidences of 1,122×1,122 pixels reach the predetermined confidence or not may be judged in the present disclosure respectively, thereby statistically obtaining the number of the pixels reaching the predetermined confidence.

In an optional example, S310 may be executed by the processor by calling corresponding instructions stored in the memory, or may be executed by a second unit operated by the processor.

In 320, the remote sensing image block of which the number of the pixels reaching the predetermined confidence does not meet a predetermined requirement is determined as a selected remote sensing image block.

In an optional example, for any remote sensing image block, if a ratio of the number of pixels reaching the predetermined confidence in the region, corresponding to the remote sensing image, of the remote sensing image to be recognized to the number of at least one pixel in the region does not reach a predetermined ratio, the remote sensing image block may be determined as a selected remote sensing image block and input into the neural network, and then category probability information of at least one pixel in the remote sensing image block is obtained through the neural network; and if the ratio reaches the predetermined ratio, the remote sensing image block is not required to be input into the neural network. The predetermined ratio in the present disclosure may be set according to the practical requirement. For example, the predetermined ratio may be set to be 0.97.

In addition, the remote sensing image block not meeting the predetermined requirement may also be determined in another manner in the present disclosure. For example, under the condition of judging that a difference value between the number of the pixels reaching the predetermined confidence in the region of the remote sensing image to be recognized that corresponds to the remote sensing image block to the number of pixels not reaching the predetermined confidence in the region reaches a predetermined difference value, the remote sensing image block may be determined as a selected remote sensing image block and input into the neural network, otherwise the remote sensing image block is not required to be input into the neural network. For another example, under a condition that a ratio of the number of the pixels reaching the predetermined confidence in the region of the remote sensing image to be recognized that corresponds to the remote sensing image block to the number of the pixels not reaching the predetermined confidence in the region does not reach the predetermined ratio, the remote sensing image block may be determined as a selected remote sensing image block and input into the neural network, otherwise the remote sensing image block is not required to be input into the neural network. An implementation of determining the remote sensing image block not meeting the predetermined requirement is not limited in the present disclosure.

In an optional example, S320 may be executed by the processor by calling corresponding instructions stored in the memory, or may be executed by a third unit operated by the processor.

Figure 4:
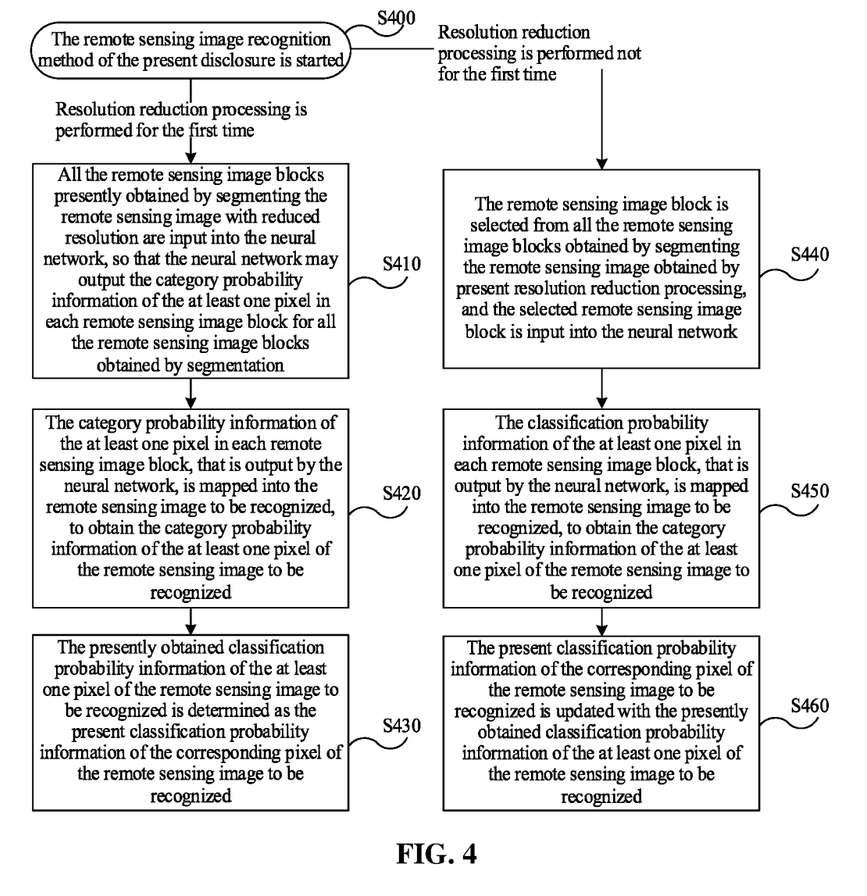
FIG. 4 is a flowchart of an implementation of maintaining present category probability information of at least one pixel of a remote sensing image to be recognized according to the present disclosure.

In the present disclosure, a manner for maintaining the present category probability information of the at least one pixel of the remote sensing image to be recognized is illustrated in FIG. 4.

In FIG. 4, in S400, the remote sensing image recognition method of the present disclosure is started. Optionally, in the present disclosure, when the remote sensing image recognition method is started, the present category probability information of the at least one pixel of the remote sensing image to be recognized is initialized. For example, the present category probability information of the at least one pixel of the remote sensing image to be recognized is set to be 0. Of course, it is also entirely feasible not to execute an initialization operation on the present category probability information of the at least one pixel of the remote sensing image to be recognized.

Under a condition that the resolution reduction processing is executed for the first time in the present disclosure, S410 is triggered to be executed.

Under a condition that the resolution reduction processing is performed not for the first time, for example, for the second time or for the third time, in the present disclosure, S440 is triggered to be executed.

In S410, all the remote sensing image blocks presently obtained by segmenting the remote sensing image with reduced resolution are input into the neural network, so that the neural network may output the category probability information of the at least one pixel in each remote sensing image block for all the remote sensing image blocks obtained by segmentation. S420 is executed.

In S420, the category probability information, output by the neural network, of the at least one pixel in each remote sensing image block is mapped to the remote sensing image to be recognized to obtain the category probability information of the at least one pixel of the remote sensing image to be recognized. S430 is executed.

In an optional example, under a condition that the resolution reduction processing is executed for the first time in the present disclosure, the category probability information, obtained based on the category probability information, output by the neural network, of all the pixels in each remote sensing image block, of any pixel (i, j) in the remote sensing image to be recognized may be represented as:

$$P_{ij}^1 = [P_{ij,1}^1, P_{ij,2}^1, \ldots P_{ij,C}^1].$$

The superscript 1 in $P_{ij}^1$, $P_{ij,1}^1$, $P_{ij,2}^1$ and $P_{ij,C}^1$ represents that resolution reduction processing is performed for the first time, C represents the number of classes obtained by category of the neural network, $P_{ij,1}^1$ represents category probability information that the pixel (i, j) in the remote sensing image to be recognized belongs to a first class under a condition that the resolution reduction processing is performed for the first time, $P_{ij,2}^1$ represents category probability information that the pixel (i, j) in the remote sensing image to be recognized belongs to a second class under a condition that the resolution reduction processing is performed for the first time, and $P_{ij,C}^1$ represents category probability information that the pixel (i, j) in the remote sensing image to be recognized belongs to a Cth class under a condition that the resolution reduction processing is executed for the first time.

In S430, the presently obtained category probability information of the at least one pixel of the remote sensing image to be recognized is determined as the present category probability information of the corresponding pixel of the remote sensing image to be recognized. For example, the present category probability information of the pixel (i, j) of the remote sensing image to be recognized is $P_{ij} = [P_{ij,1}, P_{ij,2}, \ldots P_{ij,C}]$.

In an optional example, S420 and S430 may be executed by the processor by calling corresponding instructions stored in the memory, or may be executed by a fourth unit operated by the processor.

In S440, the remote sensing image block is selected from all the remote sensing image blocks obtained by segmenting the remote sensing image obtained by present resolution reduction processing, and the selected remote sensing image block is input into the neural network. S450 is executed.

In the present disclosure, an example of a remote sensing image block selection process may refer to the above descriptions about FIG. 3 and will not be repeatedly described herein.

In S450, the category probability information, output by the neural network, of the at least one pixel in each remote sensing image block is mapped to the remote sensing image to be recognized to obtain the category probability information of the at least one pixel of the remote sensing image to be recognized. S460 is executed.

In an optional example, under a condition that the resolution reduction processing is executed for the nth time (n is greater than 1) in the present disclosure, the category probability information $P_{ij}^n$, obtained based on the category probability information, output by the neural network, of all the pixels in each remote sensing image block, of any pixel (i, j) in the remote sensing image to be recognized may be represented as $P_{ij}^n = [P_{ij,1}^n, P_{ij,2}^n, \ldots P_{ij,C}^n]$.

The superscript n in $P_{ij}^n$, $P_{ij,1}^n$, $P_{ij,2}^n$ and $P_{ij,C}^n$ represents that resolution reduction processing is executed for the nth time, C represents the number of the classes obtained by category of the neural network, $P_{ij,1}^n$ represents category probability information that the pixel (i, j) in the remote sensing image to be recognized belongs to the first class under a condition that the resolution reduction processing is executed for the nth time, $P_{ij,2}^n$ represents category probability information that the pixel (i, j) in the remote sensing image to be recognized belongs to the second class under a condition that the resolution reduction processing is executed for the nth time, and $P_{ij,C}^n$ represents category probability information that the pixel (i, j) in the remote sensing image to be recognized belongs to the Cth class under a condition that the resolution reduction processing is executed for the nth time. It is to be particularly noted that, if the pixel (i, j) in the remote sensing image to be recognized in a pixel, mapped to the region in the remote sensing image to be recognized, of the remote sensing image block selected in the present resolution reduction processing process, $P_{ij}^n$ is the category probability information, output by the neural network, of the corresponding pixel and, if the pixel (i, j) is not a pixel, mapped to the region in the remote sensing image to be recognized, of the remote sensing image block selected in the present resolution reduction processing process, $P_{ij}^n$ may be set to be 0 in the present disclosure.

In an optional example, S450 may be executed by the processor by calling corresponding instructions stored in the memory, or may be executed by a fifth unit operated by the processor.

In S460, the present category probability information of the corresponding pixel of the remote sensing image to be recognized is updated with the presently obtained category probability information of the at least one pixel of the remote sensing image to be recognized.

In an optional example, under a condition that the resolution reduction processing is performed not for the first time, for example, for the second time or for the third time, previously obtained category probability information of all the pixels in each remote sensing image block to be processed is accumulated to obtain the present category probability information of all the pixels of the remote sensing image to be recognized in the present disclosure.

It is set that, under a condition that the resolution reduction processing is performed for the first time, the category probability information, obtained in the present disclosure, of any pixel (i, j) in the remote sensing image to be recognized is $P_{ij}^1=[P_{ij,1}^1, P_{ij,2}^1, \ldots P_{ij,C}^1]$, so that $P_{ij}^1=[P_{ij,1}^1, P_{ij,2}^1, \ldots P_{ij,C}^1]$ is recorded as the present category probability information $P_{ij}=[P_{ij,1}, P_{ij,2}, \ldots P_{ij,C}]$ of the pixel (i, j) in the remote sensing image to be recognized in the present disclosure.

Under a condition that the resolution reduction processing is executed for the second time, the category probability information, obtained based on the neural network in the present disclosure, of any pixel (i, j) in the remote sensing image to be recognized may be represented as $P_{ij}^2=[P_{ij,1}^2, P_{ij,2}^2, \ldots P_{ij,C}^2]$, where $P_{ij}^2$ is the category probability information, output by the neural network, of the corresponding pixel if the pixel (i, j) in the remote sensing image to be recognized is a pixel, mapped to the region in the remote sensing image to be recognized, of the remote sensing image block selected in a second resolution reduction processing process, and $P_{ij}^2$ is 0 if the pixel (i, j) in the remote sensing image to be recognized is not a pixel, mapped to the region in the remote sensing image to be recognized, of the remote sensing image block selected in the second resolution reduction processing process. In the present disclosure, for $P_{ij}^2$ that is not 0, an average value of $P_{ij}^1=[P_{ij,1}^1, P_{ij,2}^1, \ldots P_{ij,C}^1]$ and $P_{ij}^2=[P_{ij,1}^2, P_{ij,2}^2, \ldots P_{ij,C}^2]$ may be calculated, and the present category probability information $P_{ij}=[P_{ij,1}, P_{ij,2}, \ldots P_{ij,C}]$ of the corresponding pixel (i, j) in the remote sensing image to be recognized may be updated with the calculated average value.

Under a condition that the resolution reduction processing is executed for the third time, the category probability information, obtained based on the neural network in the present disclosure, of any pixel (i, j) in the remote sensing image to be recognized may be represented as $P_{ij}^3=[P_{ij,1}^3, P_{ij,2}^3, \ldots P_{ij,C}^3]$, where $P_{ij}^3$ is the category probability information, output by the neural network, of the corresponding pixel if the pixel (i, j) in the remote sensing image to be recognized is a pixel, mapped to the region in the remote sensing image to be recognized, of the remote sensing image block selected in a third resolution reduction processing process, and $P_{ij}^3$ is 0 if the pixel (i, j) in the remote sensing image to be recognized is not a pixel, mapped to the region in the remote sensing image to be recognized, of the remote sensing image block selected in the third resolution reduction processing process. In the present disclosure, for $P_{ij}^3$ that is not 0, an average value of $P_{ij}^1=[P_{ij,1}^1, P_{ij,2}^1, \ldots P_{ij,C}^1]$, $P_{ij}^2=[P_{ij,1}^2, P_{ij,2}^2, \ldots P_{ij,C}^2]$ and $P_{ij}^1=[P_{ij,1}^3, P_{ij,2}^3, \ldots P_{ij,C}^3]$ may be calculated, and the present category probability information $P_{ij}=[P_{ij,1}, P_{ij,2}, \ldots P_{ij,C}]$ the corresponding pixel (i, j) in the remote sensing image to be recognized may be updated with the calculated average value.

By parity of reasoning, according to the processes of updating the present category probability information of all the pixels of the remote sensing image to be recognized under the conditions that resolution reduction processing is executed for the second time and for the third time, it can be known that a process of updating the present category probability information of all the pixels of the remote sensing image to be recognized under a condition that the resolution reduction processing is performed not for the first time (for the nth time), for example, for the fourth time or for the fifth time, actually refers to merging the previous category probability information, for example, merging $P_{ij}^1, \ldots P_{ij}^n$, to form the updated present category probability information of all the pixels of the remote sensing image to be recognized. However, in the present disclosure, the present category probability information, that a remote sensing image block required to be input into the neural network is selected according to, of all the pixels of the remote sensing image to be recognized is a merging result of the previous category probability information, for example, a merging result of $P_{ij}^1, \ldots P_{ij}^{n-1}$.

In an optional example, S460 may be executed by the processor by calling corresponding instructions stored in the memory, or may be executed by a sixth unit operated by the processor.

In S230, under a condition that the reduction scale set does not include any unused minimum reduction value or no remote sensing image block may be selected from the at least one remote sensing image block, a recognition result of the remote sensing image to be recognized is determined according to the category probability information, formed based on the category probability information of the at least one pixel in each selected remote sensing image, of the at least one pixel in the remote sensing image to be recognized, otherwise S200 is re-executed.

In an optional example, under a condition that the reduction scale set does not include any unused minimum reduction value, the recognition result of the remote sensing image to be recognized may be determined according to the present category probability information of all the pixels in the remote sensing image to be recognized in the present disclosure, namely $P_{ij}^1, \ldots P_{ij}^n$ are merged to obtain $P_{ij}=[P_{ij,1}, P_{ij,2}, \ldots P_{ij,C}]$ and then the maximum probability in $P_{ij,1}, P_{ij,2}, \ldots P_{ij,C}$ is determined as the recognition result of the pixel (i, j) in the remote sensing image to be recognized in the present disclosure.

In an optional example, under a condition that no remote sensing image block may be selected from the at least one remote sensing image block, the recognition result of the remote sensing image to be recognized may be determined according to the present category probability information of all the pixels in the remote sensing image to be recognized in the present disclosure, namely $P_{ij}^1, \ldots P_{ij}^{n-1}$ are merged to obtain $P_{ij}=[P_{ij,1}, P_{ij,2}, \ldots P_{ij,C}]$ and then the maximum probability in $P_{ij,1}, P_{ij,2}, \ldots P_{ij,C}$ is determined as the recognition result of the pixel (i, j) in the remote sensing image to be recognized in the present disclosure.

In an optional example, S230 may be executed by the processor by calling corresponding instructions stored in the memory, or may be executed by a recognition result determination module 540 operated by the processor.

In an optional example, in the present disclosure, when the neural network is trained, adopted remote sensing image samples usually include remote sensing image samples with various resolutions, and the number of different resolutions is usually related to the number of the reduction values in the reduction scale set. For example, under a condition that the reduction scale set includes three reduction values, a sample dataset at least includes remote sensing image samples with resolutions corresponding to the three reduction values, and each remote sensing image sample has label information (for example, mask label information). Under a normal condition, the numbers of the remote sensing image samples with different resolutions in the sample dataset are substantially the same. In the present disclosure, the neural network is trained by use of the remote sensing image samples with different resolutions in the sample dataset, which is favorable for improving the accuracy of outputting the category probability information by the neural network for the input remote sensing image block to be processed and further favorable for improving the remote sensing image recognition accuracy of the neural network.

A remote sensing image is usually different from a conventional image such as a photo or a picture or a video frame. A size of a remote sensing image is usually relatively large. For example, a length and width of a remote sensing image may reach thousands and even ten thousands of pixels. If a remote sensing image to be recognized is recognized directly by use of a neural network, negative influence may be brought to the reliability of a recognition result due to a limited receptive field of a neuron on one hand, and on the other hand, the calculation cost and time cost of the neural network may be relatively high. In the present disclosure, resolution reduction processing is performed on the remote sensing image to be recognized, and the remote sensing image with reduced resolution is processed through the neural network, so that reduction in the calculation cost and time cost of the neural network is facilitated. In the present disclosure, the remote sensing image block is selected from the remote sensing image with reduced resolution and input into the neural network, so that reduction in the calculation amount of the neural network for recognition processing over a corresponding local region in the remote sensing image with reduced resolution is facilitated. In the present disclosure, the remote sensing image block may be selected according to the present confidence of the pixels in the remote sensing image to be recognized in the resolution reduction processing process, and in such case, for some image regions easy to recognize in the remote sensing image to be recognized, because the accuracy of recognizing them by the neural network is relatively high, after each resolution reduction processing, contributions made by repeatedly performing category processing on such an image region through the neural network to the accuracy of a final category result of the image region are not so prominent; while for some image regions difficult to recognize in the remote sensing image to be recognized, contributions made by repeatedly performing category processing on such an image region through the neural network to the accuracy of a final category result of the image region are relatively prominent. Moreover, in multiple resolution reduction processes, the resolution of the remote sensing image obtained by previous resolution reduction processing is lower than the resolution of the remote sensing image obtained by next resolution reduction processing, and in such a manner, if the accuracy of a recognition result of an image block obtained after previous resolution reduction processing meets a requirement, recognition processing may not be performed on the image block in the corresponding region obtained after next resolution reduction processing, so that the calculation amount and processing time of the neural network may be reduced to a relatively great extent. It can be seen that the technical solutions provided in the present disclosure are favorable for reducing the time and calculation cost of the neural network and improving the remote sensing image recognition efficiency of the neural network under the condition of ensuring the remote sensing image recognition accuracy.

In a practical test process, for a remote sensing image verification set including 209 Panchromatic and Multispectral Scanners (PMSs) of Satellite GF-1, under a condition that the reduction values in the reduction scale set are 0.5 and 1.0, the technical solutions of the present disclosure, compared with remote sensing image recognition in the conventional art, have the advantages that the calculation amount may be reduced by about 35%, and the recognition accuracy is improved to a certain extent. For example, mIoU may be improved from 0.8366 to 0.8383.

Any remote sensing image recognition method provided in the embodiment of the present disclosure may be executed by any proper device with a data processing capability, including, but not limited to, a terminal device and a server. Or, any remote sensing image recognition method provided in the embodiment of the present disclosure may be executed by the processor. For example, the processor calls the corresponding instructions stored in the memory to execute any remote sensing image recognition method mentioned in the embodiment of the present disclosure. Elaborations are omitted hereinafter.

Those of ordinary skill in the art should know that all or part of the operations of the method embodiment may be implemented by related hardware instructed through a program, the program may be stored in a computer-readable storage medium, and the program is executed to execute the operations of the method embodiment. The storage medium includes: at least one medium capable of storing program codes such as a Read-Only Memory (ROM), a Random Access Memory (RAM), a magnetic disk or an optical disk.

Figure 5:
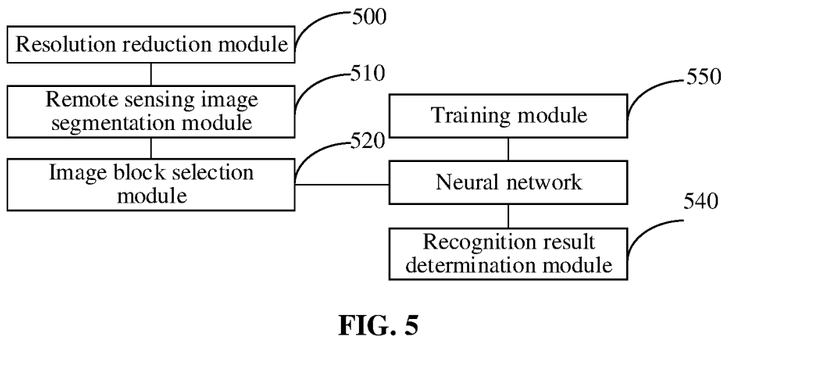
FIG. 5 is a schematic diagram of an implementation of a remote sensing image recognition apparatus according to the present disclosure.

FIG. 5 is a structure diagram of an embodiment of a remote sensing image recognition apparatus according to the present disclosure. As illustrated in FIG. 5, the apparatus of the embodiment mainly includes a resolution reduction module 500, a remote sensing image segmentation module 510, an image block selection module 520, a category processing module 530 and a recognition result determination module 540. Optionally, the apparatus may further include a training module 550.

The resolution reduction module 500 is mainly configured to perform resolution reduction processing on a remote sensing image to be recognized to obtain a remote sensing image with reduced resolution. For example, the resolution reduction module 500 may be configured to perform resolution reduction processing on the remote sensing image to be recognized according to an unused reduction value in a reduction scale set. The reduction scale set includes at least two different reduction values, and the relatively low reduction value, compared with the relatively high reduction value, may be preferred to be used by the resolution reduction module 500. The operation executed by the resolution reduction module 500 may refer to the descriptions about S100 in FIGS. 1 and S200 in FIG. 2 and will not be repeatedly described herein.

The remote sensing image segmentation module 510 is mainly configured to segment the remote sensing image obtained after the resolution reduction module 500 executes resolution reduction processing to obtain at least one remote sensing image block. The operation executed by the remote sensing image segmentation module 510 may refer to the descriptions about S110 in FIGS. 1 and S210 in FIG. 2 and will not be repeatedly described herein.

The image block selection module 520 is mainly configured to determine a remote sensing image block to be processed in the remote sensing image block obtained by segmentation by the remote sensing image segmentation module 510. Optionally, under a condition that the apparatus of the present disclosure executes resolution reduction processing for the first time, the image block selection module 520 may determine all remote sensing image blocks obtained by segmentation by the remote sensing image segmentation module 510 as remote sensing image blocks to be processed. Under a condition that the apparatus of the present disclosure executes resolution reduction processing not for the first time, the number of remote sensing image blocks to be processed selected by the image block selection module 520 is less than or equal to the number of all the remote sensing image blocks presently obtained by segmentation by the remote sensing image segmentation module. For example, under a condition that the resolution reduction processing is performed not for the first time, the image block selection module 520 may select the remote sensing image block to be processed from all the remote sensing image blocks presently obtained by segmentation by the remote sensing image segmentation module 510 according to present confidences of the pixels of the remote sensing image to be recognized.

In an optional example, the image block selection module 520 may include a first unit, a second unit and a third unit. The first unit is mainly configured to determine, according to present category probability information of at least one of a plurality of pixels in the remote sensing image to be recognized, a present confidence of the at least one pixel. The second unit is mainly configured to statistically obtain a number of pixels of which the present confidences reach a predetermined confidence in the at least one pixel in a region of the remote sensing image to be recognized that corresponds to the remote sensing image block. The third unit is mainly configured to determine the remote sensing image block of which the number of the pixels reaching the predetermined confidence does not meet a predetermined requirement as a remote sensing image block to be processed. For example, for a remote sensing image block, under a condition that a ratio of the number of pixels reaching the predetermined confidence to the number of at least one pixel in a region of the remote sensing image to be recognized that corresponds to the remote sensing image block is lower than a predetermined ratio, the third unit determines the remote sensing image block as a remote sensing image block to be processed. The operation executed by the first unit may refer to the descriptions about S300 in FIG. 3. The operation executed by the second unit may refer to the descriptions about S310 in FIG. 3. The operation executed by the third unit may refer to the descriptions about S320 in FIG. 3. Repeated descriptions are omitted herein.

In an optional example, the image block selection module 520 may further include a fourth unit, a fifth unit and a sixth unit. The fourth unit is mainly configured to, under a condition that the resolution reduction processing is performed for the first time, map category probability information, output by a neural network, of at least one pixel in each remote sensing image block to be processed to the remote sensing image to be recognized to obtain category probability information of the at least one pixel of the remote sensing image to be recognized. The category probability information of the at least one pixel of the remote sensing image to be recognized is determined as the present category probability information of the at least one pixel of the remote sensing image to be recognized. The fifth unit is mainly configured to, under a condition that the resolution reduction processing is performed not for the first time, map the category probability information of the at least one pixel in each remote sensing image block to be processed, that is output by the neural network, to the remote sensing image to be recognized to obtain the category probability information of the at least one pixel of the remote sensing image to be recognized. The sixth unit is mainly configured to update the present category probability information of the corresponding pixel of the remote sensing image to be recognized with the presently obtained category probability information of the at least one pixel of the remote sensing image to be recognized. For example, the sixth unit may be configured to calculate an average value of the presently obtained category probability information of the at least one pixel of the remote sensing image to be recognized and the present category probability information of the corresponding pixel in the remote sensing image to be recognized and update the present category probability information of the corresponding pixel in the remote sensing image to be recognized with the calculated average value. The operation executed by the fourth unit may refer to the descriptions about S420 and S430 in FIG. 4. The operation executed by the fifth unit may refer to the descriptions about S450 in FIG. 4. The operation executed by the sixth unit may refer to the descriptions about S460 in FIG. 4. Repeated descriptions are omitted herein.

The category processing module 530 is mainly configured to obtain category probability information of pixels in the remote sensing image block to be processed through the neural network. The operation executed by the category processing module 530 may refer to the related descriptions about S130 in FIG. 1 and S220 in FIG. 2 and will not be repeatedly described herein.

The recognition result determination module 540 is mainly configured to determine a recognition result of the remote sensing image to be recognized according to the category probability information of the pixels in the remote sensing image block to be processed. For example, the recognition result determination module 540, responsive to that the reduction scale set does not include any unused reduction value or determining that the remote sensing image block obtained by segmentation by the remote sensing image segmentation module 510 does not include any remote sensing image block to be processed, may determine the recognition result of the remote sensing image to be recognized according to the category probability information of the pixels in the remote sensing image block to be processed. For example, for a pixel in the remote sensing image to be recognized, the recognition result determination module 540 determines a maximum probability of probabilities of the pixel belonging to the categories in present category probability information of the pixel and determines the maximum probability and the category corresponding to the maximum probability as a recognition result of the pixel. The operation executed by the recognition result determination module 540 may refer to the descriptions about S140 in FIG. 1 and S230 in FIG. 2 and will not be repeatedly described herein.

The training module 550 is mainly configured to train the neural network to be trained by using remote sensing image samples. Resolutions of the remote sensing image samples include resolutions of each remote sensing image obtained after resolution reduction processing is performed on the remote sensing image according to each reduction value in the reduction scale set. For example, the reduction scale set includes a first reduction value, a second reduction value and a third reduction value, the first reduction value corresponds to a first resolution, the second reduction value corresponds to a second resolution, and the third reduction value corresponds to a third resolution. In such case, the training module 550 may train a neural network to be trained by use of a remote sensing image sample with the first resolution, a remote sensing image sample with the second resolution and a remote sensing image sample with the third resolution, and the successfully trained neural network may be configured for remote sensing image recognition of the present disclosure.

Exemplary Device

Figure 6:
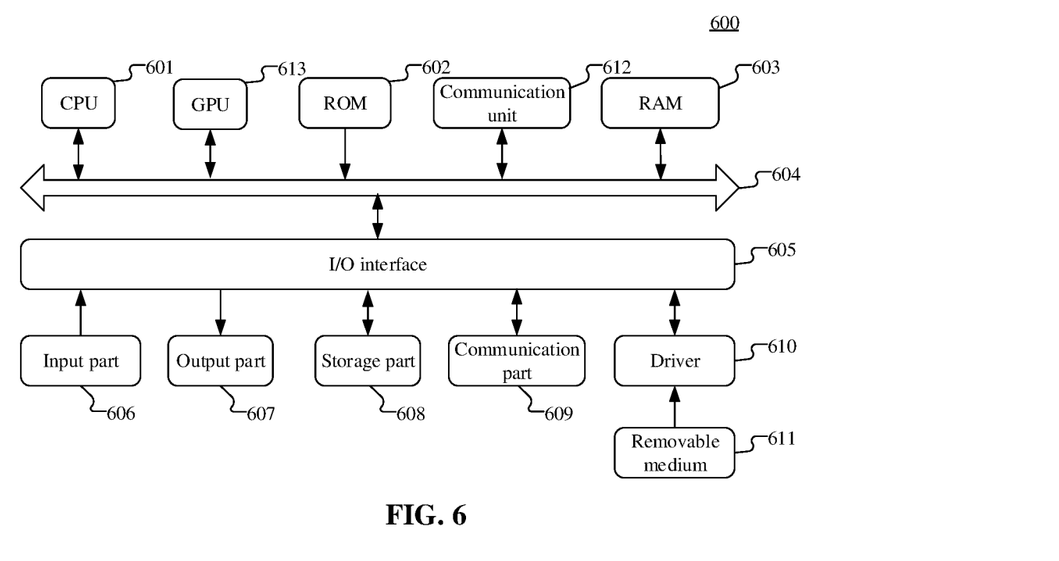
FIG. 6 is a block diagram of an exemplary device implementing an implementation of the present disclosure.

FIG. 6 illustrates an exemplary device 600 suitable for implementing the present disclosure. The device 600 may be a control system/electronic system configured in an automobile, a mobile terminal (for example, a smart mobile phone), a PC (for example, a desktop computer or a notebook computer), a tablet computer and a server, etc. In FIG. 6, the device 600 includes one or more processors, a communication unit and the like. The one or more processors may be one or more Central Processing Units (CPUs) 601 and/or one or more acceleration units 613 for implementing remote sensing image recognition by use of a neural network, etc. The acceleration unit 613 may include, but not limited to, a Graphics Processing Unit (GPU), an FPGA and another type of dedicated processor, etc. The processor may execute various proper actions and processing according to an executable instruction stored in a ROM 602 or an executable instruction loaded from a storage part 608 to a RAM 603. The communication unit 612 may include, but not limited to, a network card, and the network card may include, but not limited to, an Infiniband (IB) network card. The processor may communicate with the ROM 602 and/or the RAM 603 to execute the executable instruction, is connected with the communication unit 612 through a bus 604 and communicates with another target device through the communication unit 612, thereby completing the corresponding operations in the present disclosure.

The operation executed according to each instruction may refer to the related descriptions in the method embodiment and will not be described herein in detail.

In addition, various programs and data required by the operations of the apparatus may further be stored in the RAM 603. The CPU 601 or the acceleration unit 613, the ROM 602 and the RAM 603 are connected with one another through the bus 604. Under a condition that there is the RAM 603, the ROM 602 is an optional module. The RAM 603 stores the executable instruction, or the executable instruction is written in the ROM 602 during running, and through the executable instruction, the processor executes the corresponding operation of the method. An Input/Output (I/O) interface 605 is also connected to the bus 604. The communication unit 612 may be integrated, or may be arranged to include multiple submodules (for example, multiple IB network cards) connected with the bus respectively.

The following components are connected to the I/O interface 605: an input part 606 including a keyboard, a mouse and the like; an output part 607 including a Cathode-Ray Tube (CRT), a Liquid Crystal Display (LCD), a speaker and the like; the storage part 608 including a hard disk and the like; and a communication part 609 including a Local Area Network (LAN) card and a network interface card of a modem and the like. The communication part 609 executes communication processing through a network such as the Internet. A driver 610 is also connected to the I/O interface 605 as required. A removable medium 611, for example, a magnetic disk, an optical disk, a magneto-optical disk and a semiconductor memory, is installed on the driver 610 as required such that a computer program read therefrom is installed in the storage part 608 as required.

It is to be particularly noted that the architecture illustrated in FIG. 6 is only an optional implementation and the number and types of the components in FIG. 6 may be selected, deleted, added or replaced according to a practical requirement in a specific practice process. In terms of arrangement of different functional components, an implementation such as separate arrangement or integrated arrangement may also be adopted. For example, the acceleration unit 613 and the CPU 601 may be separately arranged. For another example, the acceleration unit 613 may be integrated to the CPU 601, and the communication unit 612 may be separately arranged or may be integrated to the CPU 601 or the acceleration unit 613. All these alternative implementations shall fall within the scope of protection of the present disclosure.

Particularly, according to the implementation of the present disclosure, the process described below with reference to the flowchart may be implemented as a computer software program. For example, the implementation of the present disclosure includes a computer program product, which includes a computer program physically included in a machine-readable medium, the computer program includes a program code configured to execute the operations illustrated in the flowchart, and the program code may include an instruction corresponding to the operations provided in the present disclosure.

In this implementation, the computer program may be downloaded from the network and installed through the communication part 609 and/or installed from the removable medium 611. The computer program is executed by the CPU 601 to execute the instruction recorded in the present disclosure.

In one or more optional implementations, the embodiment of the disclosure also provides a computer program product, which is configured to store a computer-readable instruction, the instruction being executed to enable a computer to execute the remote sensing image recognition method in any abovementioned embodiment.

The computer program product may specifically be implemented through hardware, software or a combination thereof. In an optional example, the computer program product is specifically embodied as a computer storage medium. In another optional example, the computer program product is specifically embodied as a software product, for example, a Software Development Kit (SDK).

In one or more optional implementations, the embodiment of the disclosure also provides another remote sensing image recognition method, as well as a corresponding apparatus, an electronic device, a computer storage medium, a computer program and a computer program product. The method includes that: a first apparatus sends a remote sensing image recognition instruction to a second apparatus, the instruction enabling the second apparatus to execute the remote sensing image recognition method in any abovementioned possible embodiment; and the first apparatus receives a remote sensing image recognition result sent by the second apparatus.

In some embodiments, the remote sensing image recognition instruction may specifically be a calling instruction, the first apparatus may instruct the second apparatus in a calling manner to execute a remote sensing image recognition operation, and correspondingly, the second apparatus, responsive to receiving the calling instruction, may execute the operations and/or flow in any embodiment of the remote sensing image recognition method.

It is to be understood that terms "first", "second" and the like in the embodiment of the disclosure are only adopted for distinguishing and should not be understood as limits to the embodiment of the disclosure.

It is also to be understood that, in the disclosure, "multiple" may refer to two or more than two and "at least one" may refer to one, two or more than two.

It is also to be understood that, for any component, data or structure mentioned in the disclosure, the number thereof can be understood to be one or multiple if there is no specific limits or opposite revelations are presented in the context.

It is also to be understood that, in the disclosure, the descriptions about at least one embodiment are made with emphasis on differences between the at least one embodiment and the same or similar parts may refer to each other and will not be elaborated for simplicity.

The method, apparatus, electronic device and computer-readable storage medium of the present disclosure may be implemented in many manners. For example, the method, apparatus, electronic device and computer-readable storage medium of the present disclosure may be implemented through software, hardware, firmware or any combination of the software, the hardware and the firmware. The sequence of the operations of the method is only for description, and the operations of the method of the present disclosure are not limited to the sequence specifically described above, unless otherwise specified in another manner In addition, in some implementations, the present disclosure may also be implemented as a program recorded in a recording medium, and the program includes a machine-readable instruction configured to implement the method according to the present disclosure. Therefore, the present disclosure further covers the recording medium storing the program configured to execute the method according to the present disclosure.

The descriptions of the present disclosure are made for examples and description and are not exhaustive or intended to limit the present disclosure to the disclosed form. Many modifications and variations are apparent to those of ordinary skill in the art. The implementations are selected and described to describe the principle and practical application of the present disclosure better and enable those of ordinary skill in the art to understand the embodiment of the present disclosure and further design various implementations suitable for specific purposes and with various modifications.

Exemplary Application Scenario

Figure 7:
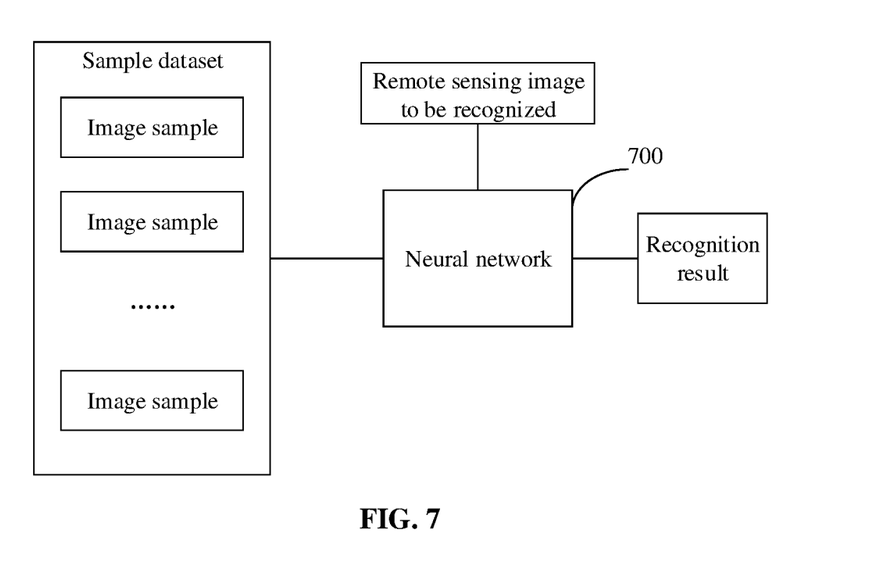
FIG. 7 is a schematic diagram of an application scenario according to the present disclosure.

Referring to FIG. 7, an application scenario where the method may be implemented according to an implementation of the present disclosure is schematically shown.

In FIG. 7, a neural network 700 is a neural network configured to recognize a remote sensing image to be recognized (for example, a cloud-snow mask or a cloud-snow-water mask is formed). A sample dataset configured to train the neural network 700 usually includes multiple remote sensing image samples, and resolutions of all the remote sensing image samples are not completely the same. After the neural network 700 is successfully trained by use of the remote sensing image samples with different resolutions in the sample dataset, the remote sensing image to be recognized from a satellite may be recognized by use of the successfully trained neural network 700, and a recognition result obtained by the neural network 700 may form a mask such as the cloud-snow mask or the cloud-snow-water mask.

However, those skilled in the art may completely understand that the present disclosure scenario of the implementation of the present disclosure is not limited by any aspect of the framework.

The method, apparatus, electronic device, computer program and computer-readable storage medium of the present disclosure may be implemented in many manners. For example, the method, apparatus, electronic device, computer program and computer-readable storage medium of the present disclosure may be implemented through software, hardware, firmware or any combination of the software, the hardware and the firmware. The sequence of the operations of the method is only for description, and the operations of the method of the present disclosure are not limited to the sequence specifically described above, unless otherwise specified in another manner In addition, in some implementations, the present disclosure may also be implemented as a program recorded in a recording medium, and the program includes a machine-readable instruction configured to implement the method according to the present disclosure. Therefore, the present disclosure further covers the recording medium storing the program configured to execute the method according to the present disclosure.

The descriptions of the present disclosure are made for purpose of examples and description and are not exhaustive or intended to limit the present disclosure to the disclosed form. Many modifications and variations are apparent to those of ordinary skill in the art. The implementations are selected and described to describe the principle and practical application of the present disclosure better and enable those of ordinary skill in the art to understand the present disclosure and further design various implementations suitable for specific purposes and with various modifications.

The invention claimed is:

1. A method for recognizing a remote sensing image, comprising:

performing present resolution reduction processing on a remote sensing image to be recognized to obtain a remote sensing image with reduced resolution, wherein an image resolution of the remote sensing image to be recognized obtained after the present resolution reduction processing is executed is higher than an image resolution obtained after previous resolution reduction processing is executed;

segmenting the remote sensing image with reduced resolution to obtain at least one remote sensing image block;

determining a remote sensing image block to be processed from the at least one remote sensing image block, wherein under a condition that the resolution reduction processing is performed not for a first time, a number of the at least one remote sensing image block to be processed is less than a number of remote sensing image blocks presently obtained by segmentation, and the remote sensing image block to be processed is determined from the at least one remote sensing image block according to present confidences of pixels in the remote sensing image to be recognized;

obtaining category probability information of pixels in the remote sensing image block to be processed through a neural network; and determining a recognition result of the remote sensing image to be recognized according to the category probability information of the pixels in the remote sensing image block to be processed.

2. The method of claim 1, wherein performing resolution reduction processing on the remote sensing image to be recognized comprises:

performing resolution reduction processing on the remote sensing image to be recognized according to an unused reduction value in a reduction scale set.

3. The method of claim 2, wherein determining the recognition result of the remote sensing image to be recognized according to the category probability information of the pixels in the remote sensing image block to be processed comprises:

responsive to the reduction scale set not comprising any unused reduction value or determining that the at least one remote sensing image block does not comprise any remote sensing image block to be processed, determining the recognition result of the remote sensing image to be recognized according to the category probability information of the pixels in the remote sensing image to be recognized.

4. The method of claim 2, wherein the reduction scale set comprises at least two different reduction values, and a lower reduction value is used first compared with a higher reduction value.

5. The method of claim 1, wherein determining the remote sensing image block to be processed from the at least one remote sensing image block comprises:

under a condition that the resolution reduction processing is performed for the first time, determining all of the at least one remote sensing image block as the remote sensing image block to be processed.

6. The method of claim 1, wherein determining the remote sensing image block to be processed from the at least one remote sensing image block according to the present confidence of the pixel in the remote sensing image to be recognized comprises:

determining, according to present category probability information of at least one of a plurality of pixels in the remote sensing image to be recognized, a present confidence of the at least one pixel;

statistically obtaining a number of pixels of which the present confidences reach a predetermined confidence in the at least one pixel in a region of the remote sensing image to be recognized that corresponds to each remote sensing image block; and determining a remote sensing image block, of which the number of the pixels reaching the predetermined confidence does not meet a predetermined requirement, as the remote sensing image block to be processed.

7. The method of claim 6, wherein determining the remote sensing image block, of which the number of the pixels reaching the predetermined confidence does not meet the predetermined requirement, as the remote sensing image block to be processed comprises:

for a remote sensing image block, under a condition that a ratio of the number of pixels reaching the predetermined confidence to the number of at least one pixel in a region of the remote sensing image to be recognized, that corresponds to the remote sensing image block, is lower than a predetermined ratio, determining the remote sensing image block as the remote sensing image block to be processed.

8. The method of claim 6, wherein a manner for obtaining the present category probability information of the at least one pixel in the remote sensing image to be recognized comprises:

under a condition that the resolution reduction processing is performed for the first time, mapping category probability information of at least one pixel in each remote sensing image block to be processed, that is output by the neural network, into the remote sensing image to be recognized, to obtain category probability information of the at least one pixel in the remote sensing image to be recognized, wherein the category probability information of the at least one pixel in the remote sensing image to be recognized is determined as the present category probability information of the at least one pixel in the remote sensing image to be recognized.

9. The method of claim 6, wherein a manner for obtaining the present category probability information of the at least one pixel in the remote sensing image to be recognized comprises:

under a condition that the resolution reduction processing is performed not for the first time, mapping the category probability information of the at least one pixel in each remote sensing image block to be processed, that is output by the neural network, into the remote sensing image to be recognized, to obtain the category probability information of the at least one pixel in the remote sensing image to be recognized; and updating, according to the presently obtained category probability information of the at least one pixel in the remote sensing image to be recognized, the present category probability information of the corresponding pixel in the remote sensing image to be recognized.

10. The method of claim 9, wherein updating, according to the presently obtained category probability information of the at least one pixel in the remote sensing image to be recognized, the present category probability information of the corresponding pixel in the remote sensing image to be recognized comprises:

calculating an average value of the presently obtained category probability information of the at least one pixel in the remote sensing image to be recognized and the present category probability information of the corresponding pixel in the remote sensing image to be recognized; and updating the present category probability information of the corresponding pixel in the remote sensing image to be recognized with the calculated average value.

11. The method of claim 10, wherein determining the recognition result of the remote sensing image to be recognized according to the category probability information of the pixels in the remote sensing image block to be processed comprises:

for a pixel in the remote sensing image to be recognized, determining a maximum probability of probabilities, of the pixel belonging to the categories, in the present category probability information of the pixel, and determining the maximum probability and the category corresponding to the maximum probability as a recognition result of the pixel.

12. The method of claim 2, wherein a resolution of a remote sensing image sample for training the neural network comprises: a resolution of each remote sensing image obtained by performing the resolution reduction processing on the remote sensing image according to each reduction value in the reduction scale set.

13. An apparatus for recognizing a remote sensing image, comprising:

a memory, configured to store a computer program; and a processor, configured to execute the computer program stored in the memory to:

perform present resolution reduction processing on a remote sensing image to be recognized to obtain a remote sensing image with reduced resolution, wherein an image resolution of the remote sensing image to be recognized obtained after the present resolution reduction processing is executed is higher than an image resolution obtained after previous resolution reduction processing is executed;

segment the remote sensing image with reduced resolution to obtain at least one remote sensing image block;

determine a remote sensing image block to be processed from the at least one remote sensing image block, wherein under a condition that the resolution reduction processing is performed not for a first time, a number of the at least one remote sensing image block to be processed is less than a number of remote sensing image blocks presently obtained by segmentation, and the remote sensing image block to be processed is determined from the at least one remote sensing image block according to present confidences of pixels in the remote sensing image to be recognized;

obtain category probability information of pixels in the remote sensing image block to be processed through a neural network; and determine a recognition result of the remote sensing image to be recognized according to the category probability information of the pixels in the remote sensing image block to be processed.

* * * * *